(12) United States Patent
Oshino et al.

(10) Patent No.: US 11,738,700 B2
(45) Date of Patent: Aug. 29, 2023

(54) WIRE EXTERIOR BODY AND EXTERIOR-COVERED WIRE HARNESS

(71) Applicants: Furukawa Electric Co., Ltd., Tokyo (JP); Furukawa Automotive Systems Inc., Shiga (JP)

(72) Inventors: Takashi Oshino, Koka (JP); Yoshikazu Kamei, Tokyo (JP); Hiroshi Suyama, Tokyo (JP); Shuji Yokozeki, Tokyo (JP); Naoyuki Kojima, Tokyo (JP)

(73) Assignees: Furukawa Electric Co., Ltd., Tokyo (JP); Furukawa Automotive Systems Inc., Shiga (JP)

( * ) Notice: Subject to any disclaimer, the term of this patent is extended or adjusted under 35 U.S.C. 154(b) by 0 days.

(21) Appl. No.: 17/280,153

(22) PCT Filed: Sep. 10, 2019

(86) PCT No.: PCT/JP2019/035497
§ 371 (c)(1),
(2) Date: Mar. 25, 2021

(87) PCT Pub. No.: WO2020/066594
PCT Pub. Date: Apr. 2, 2020

(65) Prior Publication Data
US 2022/0001816 A1    Jan. 6, 2022

(30) Foreign Application Priority Data

Sep. 26, 2018  (JP) ................................ 2018-180864

(51) Int. Cl.
*B60R 16/02* (2006.01)
*H01B 7/00* (2006.01)
(Continued)

(52) U.S. Cl.
CPC ......... *B60R 16/0215* (2013.01); *H01B 7/009* (2013.01); *H02G 3/0437* (2013.01); *B60R 16/023* (2013.01)

(58) Field of Classification Search
CPC .. B60R 16/0215; B60R 16/0207; H02G 3/04; H02G 3/0418; H02G 3/0437
See application file for complete search history.

(56) References Cited

U.S. PATENT DOCUMENTS

2015/0159733 A1   6/2015 Blase et al.
2019/0013654 A1*  1/2019 Suenaga ............. H02G 3/0487

FOREIGN PATENT DOCUMENTS

CN    203098735 U  *  7/2013 ............. F16G 11/02
CN    103635712 A     3/2014
(Continued)

OTHER PUBLICATIONS

English translation of International Search Report and Written Opinion for PCT Application No. PCT/JP2019/035497, dated Oct. 29, 2019.
(Continued)

*Primary Examiner* — Paresh Paghadal
(74) *Attorney, Agent, or Firm* — Dorsey & Whitney LLP

(57) ABSTRACT

A wire exterior body and an exterior-covered wire harness, capable of reducing vibration noise generated by vibration of the exterior body attached to a vehicle or the like and the wire harness in the exterior body, caused by vibration of the vehicle or the like, are provided. A wire exterior body to be attached to an outer periphery of a wire, formed by bending a resin sheet, includes a plurality of wall parts extending along the extending direction of the wire and forming an accommodating part for accommodating the wire. At least one of the plurality of wall parts has a protruding part protruding from the at least one wall part.

13 Claims, 6 Drawing Sheets

(51) Int. Cl.
*H02G 3/04* (2006.01)
*B60R 16/023* (2006.01)

(56) References Cited

FOREIGN PATENT DOCUMENTS

| | | | | | |
|---|---|---|---|---|---|
| DE | 102017105427 | A1 | * | 9/2018 | ............... H02G 3/04 |
| JP | H0348320 | U | | 5/1991 | |
| JP | H07212936 | A | | 8/1995 | |
| JP | H08196016 | A | | 7/1996 | |
| JP | H09308058 | A | | 11/1997 | |
| JP | 2013042720 | A | * | 3/2013 | ............... H02G 3/04 |
| JP | 2014510889 | A | | 5/2014 | |
| JP | 2014230422 | A | | 12/2014 | |
| JP | 2015047057 | A | | 3/2015 | |
| JP | 2015082955 | A | | 4/2015 | |
| JP | 2016082841 | A | | 5/2016 | |
| JP | 2016201240 | A | * | 12/2016 | ............. B60R 16/02 |
| JP | 2017022803 | A | | 1/2017 | |
| JP | 2017135814 | A | | 8/2017 | |
| WO | WO-2015016056 | A1 | * | 2/2015 | ........... H02G 3/0487 |
| WO | WO-2017006735 | A1 | * | 1/2017 | ............. B60R 16/02 |
| WO | 2017033262 | A1 | | 3/2017 | |

OTHER PUBLICATIONS

[English Translation] The First Office Action dated Apr. 22, 2022 for Chinese Patent Application No. 201980063211.0; pp. all.
[English Translation] Second Office Action dated Sep. 22, 2022 in CN Application No. 201980063211.0; pp. all.
[English Translation] Notice of Reasons for Refusal for Japanese Patent Application No. 2020-548368 dated Apr. 12, 2023, pp. all.

\* cited by examiner

WIRE EXTERIOR BODY AND EXTERIOR-COVERED WIRE HARNESS

RELATED APPLICATIONS

This application is a U.S. National Stage filing under 35 U.S.C. § 371 of PCT Application No. PCT/JP2019/035497, filed Sep. 10, 2019, which claims priority to Japanese Application No. JP 2018-180864 filed Sep. 26, 2018 which applications are incorporated herein by reference in their entirety, for any purpose.

TECHNICAL FIELD

The present invention relates to a wire exterior body to be attached to an outer periphery of a wire for protecting the wire such as a wire harness, and an exterior-covered wire harness.

BACKGROUND ART

Conventionally, an exterior body for a wire harness has been used to attach and fix a wire harness to a vehicle body or the like. Further, when a wire harness is accommodated in an accommodating part of the exterior body, the exterior body exhibits a function of defining the path of the wire harness and a function of protecting the wire harness. Meanwhile, due to vibration of a vehicle or the like, the exterior body attached to the vehicle or the like and the wire harness in the exterior body may vibrate and generate vibration noise. From the viewpoint of comfortable riding quality of a vehicle or the like, it is required to reduce the vibration noise.

For example, by preventing a wire harness from rattling in the exterior body, it may be expected to suppress the vibration noise. Therefore, there is a case of adopting a measure to position and fix the wire harness in the exterior body.

As an exterior body for a wire harness as described above, for example, an exterior body has been proposed which includes a base member having a support plate on which a wire harness is to be disposed, and a protruding plate protruding from the support plate, the base member extending in an extending direction of the wire harness; and a wall part adding member having an L-shape cross section and being assembled to the base member to add a wall part surrounding the wire harness, in which one end of the wall part adding member and one side of the protruding plate of the support plate, to which the one end is assembled, are connected to each other via a positioning retention mechanism (Patent Literature 1).

In the exterior body for a wire harness of Patent Literature 1, although the wire harness is positioned in the exterior body, there is still room for improvement in reduction of vibration noise caused by vibration of a vehicle or the like.

DOCUMENT LIST

Patent Literature

Patent Literature 1: Japanese Patent Application Publication No. 2017-135814

SUMMARY OF INVENTION

Technical Problem

The present invention has been made in view of the situation described above. An object of the present invention is to provide a wire exterior body and an exterior-covered wire harness capable of reducing vibration noise generated by vibration of the exterior body attached to a vehicle or the like and the wire harness in the exterior body caused by vibration of the vehicle or the like.

Solution to Problem

A summary of the configurations of a wire exterior body and an exterior-covered wire harness of the present invention is as described below.

[1] A wire exterior body to be attached to an outer periphery of a wire, the wire exterior body being formed by bending a resin sheet, the wire exterior body comprising
a plurality of wall parts extending along an extending direction of the wire, and forming an accommodating part for accommodating the wire, wherein
at least one wall part of the plurality of wall parts has a protruding part protruding from the at least one wall part.

[2] The wire exterior body according to [1], wherein the protruding part protrudes in a specific direction with respect to the extending direction of the wire at a position of the protruding part.

[3] The wire exterior body according to [2], wherein the specific direction is a vertical direction.

[4] The wire exterior body according to any one of [1] to [3], wherein a plurality of the protruding parts are provided at predetermined intervals along the extending direction of the wire at an edge portion of the at least one wall part along the extending direction of the wire.

[5] The wire exterior body according to any one of [1] to [4], wherein the protruding part is provided on a first edge portion, along the extending direction of the wire, of the at least one wall part, and on a second edge portion along the extending direction of the wire, the second edge portion facing the first edge portion.

[6] The wire exterior body according to [5], wherein the protruding part is arranged in a zigzag manner.

[7] The wire exterior body according to any one of [1] to [6], wherein a tip end portion of the protruding part is narrower in width compared with a base portion of the protruding part.

[8] The wire exterior body according to any one of [1] to [7], wherein a shape of the protruding part in the protruding direction is a triangular shape, a trapezoidal shape, a rectangular shape, or a quadrangular shape in which at least a part of corners is formed in a rounded corner shape.

[9] The wire exterior body according to any one of [1] to [8], wherein a tip end portion of the protruding part is in a wave shape.

[10] The wire exterior body according to any one of [1] to [9], wherein the protruding part is arranged at an interval ranging from 3 cm to 20 cm along the extending direction of the wire.

[11] An exterior-covered wire harness comprising:
a wire harness; and
the wire exterior body according to any one of [1] to [10], wherein
the wire exterior body is attached to an outer periphery of the wire harness.

The wire exterior body of the present invention is mounted on a target in such a manner that a tip end portion of a protruding part provided on at least one wall part of a plurality of wall parts is brought into contact with the mounting target of the wire exterior body such as a vehicle.

Effects of Invention

According to an aspect of the wire exterior body of the present invention, since a protruding part is provided on at least one wall part of a plurality of wall parts, a contact area between the wire exterior body and the mounting target such as a vehicle or the like is reduced. Therefore, even when the vehicle or the like vibrates, it is possible to reduce the vibration noise generated by the vibration of the wire exterior body and the wire harness in the wire exterior body.

DESCRIPTION OF EMBODIMENTS

Figure 1:
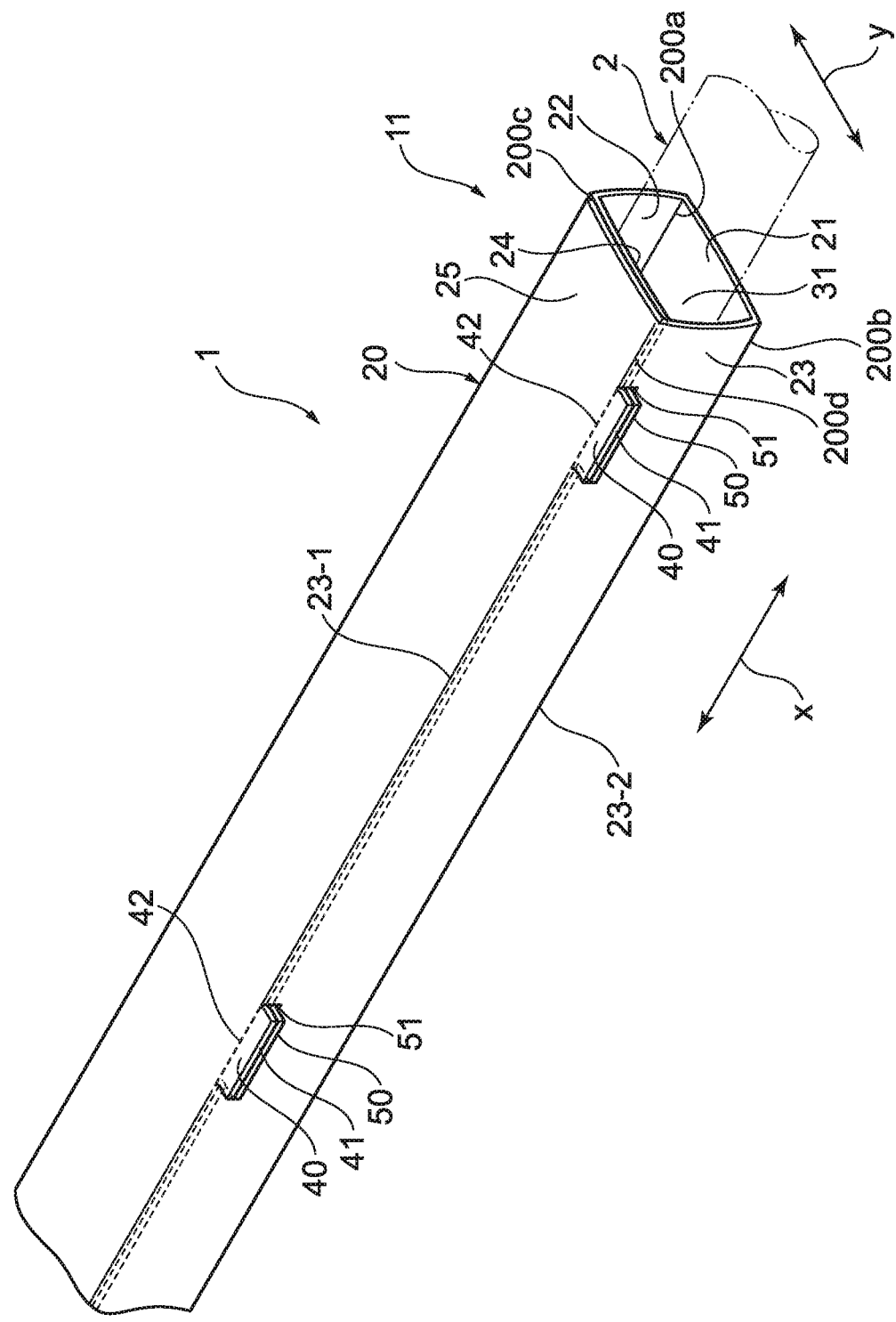
FIG. 1 A perspective view illustrating the outline of a wire exterior body and an exterior-covered wire harness according to a first exemplary embodiment of the present invention.
Figure 2:
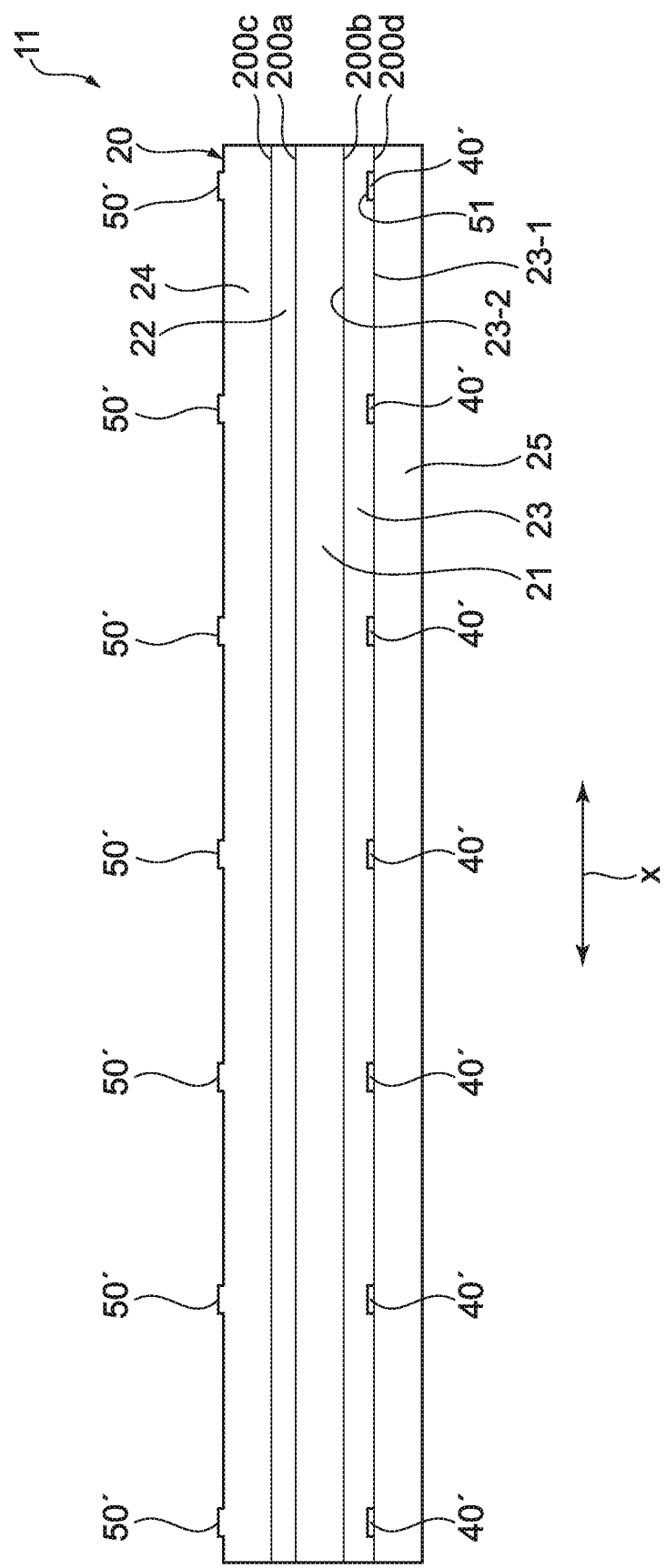
FIG. 2 An illustration showing an exploded state of the wire exterior body according to the first exemplary embodiment.
Figure 3:
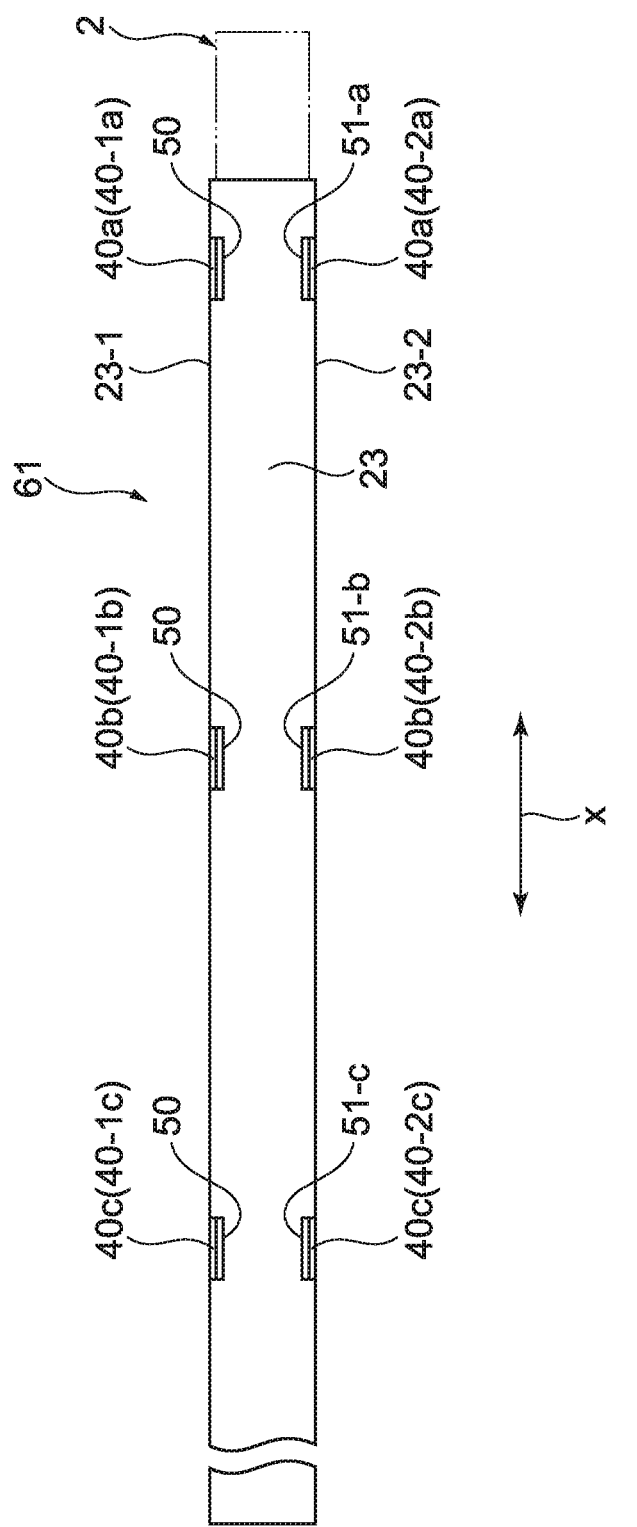
FIG. 3 A side view illustrating the outline of a wire exterior body and an exterior-covered wire harness according to a second exemplary embodiment of the present invention.
Figure 4:
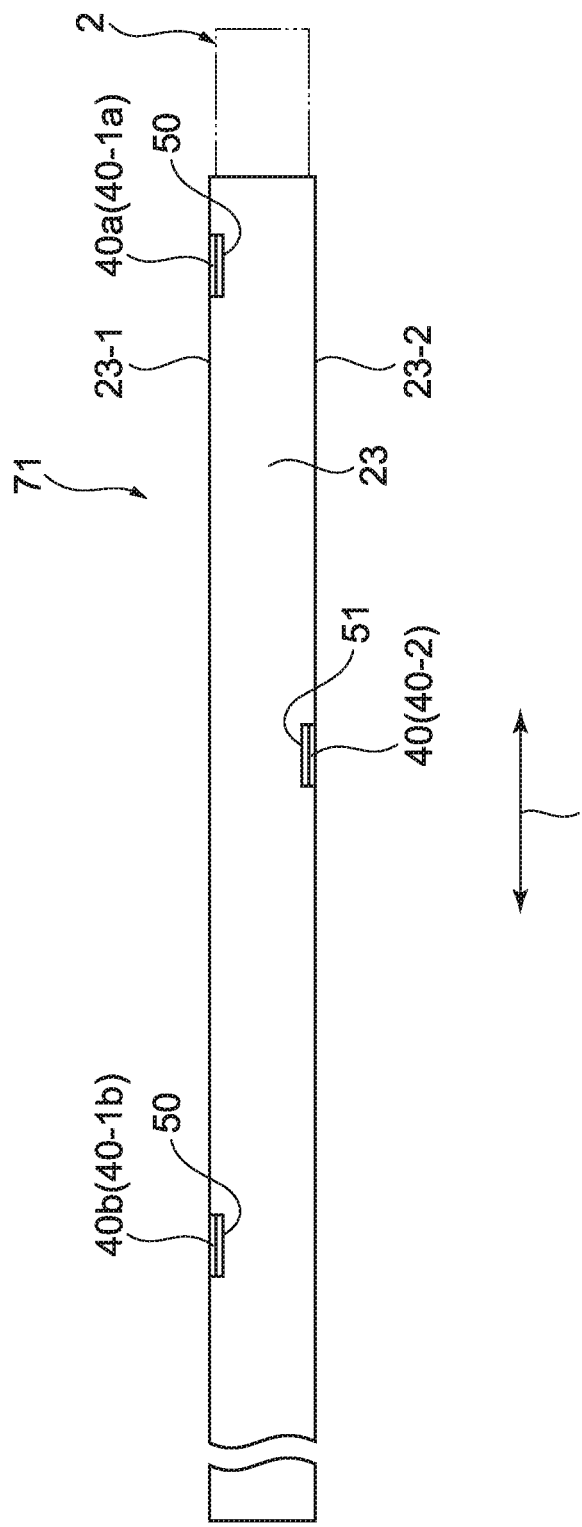
FIG. 4 A side view illustrating the outline of a wire exterior body and an exterior-covered wire harness according to a third exemplary embodiment of the present invention.
Figure 5C:
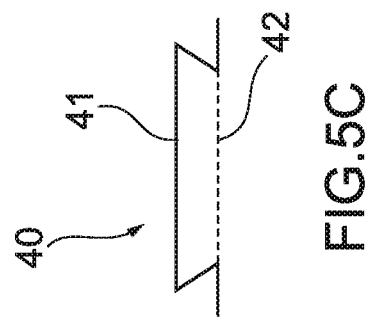
FIGS. 5A to 5C are illustrations each showing a shape of a protruding part of a wire exterior body of another exemplary embodiment of the present invention.
Figure 5B:
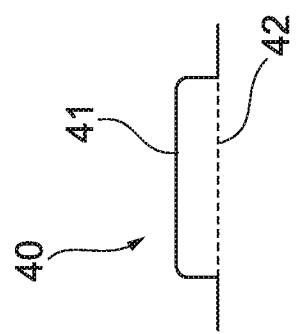
Figure 5A:
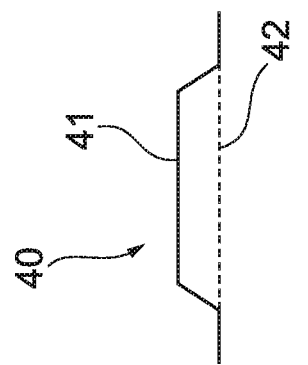
Figure 6:
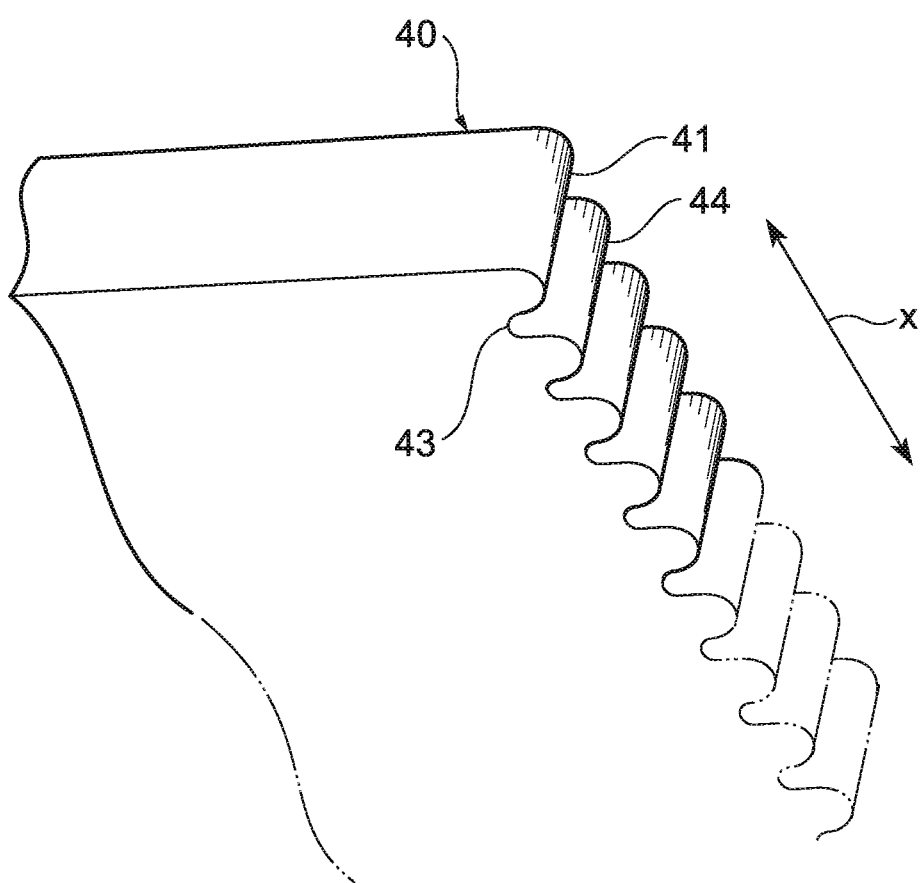
FIG. 6 An illustration showing the shape of a tip end portion of a protruding part in a wire exterior body of another exemplary embodiment of the present invention.

Details of a wire exterior body according to an exemplary embodiment of the present invention will be described below with use of the drawings. FIG. 1 is a perspective view illustrating the outline of a wire exterior body and an exterior-covered wire harness according to a first exemplary embodiment of the present invention. FIG. 2 is an illustration showing an exploded state of the wire exterior body according to the first exemplary embodiment. FIG. 3 is a side view illustrating the outline of a wire exterior body and an exterior-covered wire harness according to a second exemplary embodiment of the present invention. FIG. 4 is a side view illustrating the outline of a wire exterior body and an exterior-covered wire harness according to a third exemplary embodiment of the present invention. FIGS. 5A to 5C are illustrations each showing a shape of a protruding part of a wire exterior body of another exemplary embodiment of the present invention. FIG. 6 is an illustration showing the shape of a tip end portion of a protruding part in a wire exterior body of another exemplary embodiment of the present invention.

First, with use of FIG. 1, an exterior-covered wire harness 1 according to the first exemplary embodiment of the present invention will be described. The exterior-covered wire harness 1 according to the first exemplary embodiment of the present invention includes a wire harness 2 in which a plurality of wires are bundled, and an exterior body (wire exterior body) 11 to be attached to an outer periphery of the wire harness 2. Note that while, in FIG. 1, the wire harness 2 is illustrated in one columnar shape, the wire harness 2 is one in which a plurality of wires are bundled.

Next, the wire exterior body 11 according to the first exemplary embodiment of the present invention will be described. As illustrated in FIG. 1, the wire exterior body 11 includes a plurality of wall parts 20 extending along the extending direction of the wire harness 2 (longitudinal direction x of the wire exterior body 11). In FIG. 1, the extending direction of the wire harness 2 (longitudinal direction x of the wire exterior body 11) is linear, for the sake of convenience. A space formed by being surrounded by the plurality of wall parts 20 constitutes an accommodating part 31 for accommodating the wire harness 2. That is, the wire exterior body 11 has the accommodating part 31 formed by being surrounded by the plurality of wall parts 20. The wire harness 2 is protected from the external environment by the wire exterior body 11.

The plurality of wall parts 20 of the wire exterior body 11 are integrally formed by bending one resin sheet (for example, thermoplastic resin foamed sheet). By bending a resin sheet at bending portions 200a to 200d, the plurality of wall parts 20 are formed. The plurality of wall parts 20 include a bottom wall part 21 in a planar shape, a side wall part 22 in a planar shape continuing from an edge of the bottom wall part 21 via the bending portion 200a, a side wall part 23 in a planar shape continuing from an edge of the bottom wall part 21 via the bending portion 200b, an inner lid wall part 24 in a planar shape continuing from the tip of the side wall part 22 via the bending portion 200c, and an outer lid wall part 25 in a planar shape continuing from the tip of the side wall part 23 via the bending portion 200d. The outer lid wall part 25 is arranged so as to overlap the inner lid wall part 24 from the above to thereby form a wall part overlapping portion.

As illustrated in FIG. 1, in a cross section in a direction orthogonal to the extending direction of the wire harness 2 (short direction y in FIG. 1), the bottom wall part 21 of the plurality of wall parts 20 faces the inner lid wall part 24 and the outer lid wall part 25 and is arranged almost parallel to the inner lid wall part 24 and the outer lid wall part 25. Moreover, the side wall part 22 of the plurality of wall parts 20 faces the side wall part 23 and is arranged almost parallel to the side wall part 23. That is, in the cross section in the short direction y, the plurality of wall parts 20 include two pairs of wall parts facing each other. The cross-sectional shape in the short direction y of the plurality of wall parts 20 is a quadrangular shape.

Of the side wall part 22 and the side wall part 23 arranged to face each other, the side wall part 23 has a protruding part 40 protruding from the side wall part 23. In the side wall part 23, the protruding part 40 protrudes in a specific direction with respect to the extending direction of the wire harness 2 at the position of the protruding part 40. In the wire exterior body 11, in the side wall part 23, the protruding part 40 protrudes in the vertical direction with respect to the extending direction of the wire harness 2 at the position of the protruding part 40. This means that the protruding part 40 protrudes in the vertical direction with respect to the side wall part 23. The protruding part 40 also protrudes almost parallel to the inner lid wall part 24 and the outer lid wall part 25, and extends on an almost same plane as the outer lid wall part 25. The protruding part 40 also protrudes almost parallel to the bottom wall part 21.

The wire exterior body 11 is to be mounted on a mounting target in such a manner that the side wall part 23 having the protruding part 40 is caused to face the mounting portion of the mounting target (not shown) of a vehicle or the like so that a tip end portion 41 of the protruding part 40 contacts the mounting target. Since the protruding part 40 is provided on at least one wall part (in the wire exterior body 11, the side wall part 23) of the plurality of wall parts 20, a contact area between the wire exterior body 11 and the mounting target of a vehicle or the like is reduced. Therefore, even when the vehicle or the like vibrates, it is possible to reduce the vibration noise generated by vibration of the wire exterior body 11 and the wire harness 2 in the wire exterior body 11.

In the wire exterior body 11, the protruding part 40 is provided on one edge portion of the two edge portions, of the side wall part 23, facing each other along the extending direction of the wire harness 2, namely a first edge portion 23-1 and a second edge portion 23-2 (in FIG. 1, the first edge portion 23-1 on the outer lid wall part 25 side). Also, in the wire exterior body 11, protruding parts 40 are provided at predetermined intervals in the extending direction of the wire harness 2. The interval between the protruding parts 40 is not particularly limited. However, from the point of achieving mounting stability to the mounting target such as a vehicle or the like while reducing the vibration noise more reliably, it is preferable that the protruding parts 40 are arranged at an interval ranging from 3 cm to 20 cm, and it is more preferable that they are arranged at an interval ranging from 5 cm to 10 cm. Note that the "interval between the protruding parts" described above means the length of a portion not provided with the protruding part 40 in the extending direction of the wire harness 2 in the entire wall part in which the protruding part 40 is provided.

The shape in the protruding direction of the protruding part 40 is not particularly limited, but in the wire exterior body 11, it is a quadrangular shape. Specifically, the shape in the protruding direction of the protruding part 40 is a rectangular shape (oblong shape) in which the width of the tip end portion 41 of the protruding part 40 and the width of a base portion 42 of the protruding part are the same. Further, the tip end portion 41 of the protruding part 40 is formed linearly along the extending direction of the wire harness 2. The thickness of the protruding part 40 corresponds to the thickness of the resin sheet forming the plurality of wall parts 20.

The dimension of the protruding part 40 is not particularly limited. For example, the dimension in the extending direction of the wire harness 2 may range from 5 mm to 20 mm. Further, the dimension between the tip end portion 41 and the base portion 42 may range from 1 mm to 10 mm, for example.

As illustrated in FIG. 1, the wire exterior body 11 has a locking piece 50 protruding from the tip end portion of the inner lid wall part 24. Further, on the second edge portion 23-2 side of the protruding part 40, a through hole 51 is formed in contact with the protruding part 40. The locking pieces 50 are formed at predetermined intervals corresponding to the positions of the through holes 51. The locking piece 50 is inserted in the through hole 51. When the locking piece 50 is inserted in the through hole 51, the locking piece 50 is locked to the through hole 51. Since the locking piece 50 is locked to the through hole 51, the inner lid wall part 24 is fixed to the side wall part 23, and the plurality of wall parts 20 and the accommodating part 31 are kept in a predetermined shape. Accordingly, the locking piece 50 is arranged so as to overlap the protruding part 40.

As illustrated in FIG. 1, the accommodating part 31 is a part surrounded by the bottom wall part 21, the side wall parts 22 and 23, the inner lid wall part 24, and the outer lid wall part 25. The accommodating part 31 is formed in a tubular shape in which one side in the longitudinal direction x and the other side facing the one side penetrate, by the bottom wall part 21, the side wall parts 22 and 23, the inner lid wall part 24, and the outer lid wall part 25, and is capable of accommodating the wire harness 2.

A resin sheet to be used for the wire exterior body 11 is not particularly limited if it is foldable. Either a thermoplastic resin sheet or a thermosetting resin sheet may be used. Among them, a foamed sheet is preferable from the points of light weight, freedom in shape design, cost, and the like. In particular, a thermoplastic resin foamed sheet is more preferable. As the resin type of a thermoplastic resin foamed sheet, it is not particularly limited if it is thermoplastic resin. For example, any one such as polyethylene resin, polypropylene resin, polycarbonate resin, polyethylene terephthalate resin, polybutylene terephthalate resin, polyamide resin, polyphenylene sulfide resin, polystyrene resin, polyvinyl chloride resin, polyvinyl acetate resin, polytetrafluoroethylene resin, or acrylic resin may be used.

The density of a thermoplastic resin foamed sheet to be used for the wire exterior body 11 is not particularly limited. For example, from the points of preventing anisotropy of the mechanical characteristics, improving the freedom in design of the wire exterior body 11, and further improving the mechanical strength with respect to the stress in the direction of the wire harness 2 accommodated in the wire exterior body 11, it is preferable that the density is 200 $Kg/m^3$ or higher and 1000 $Kg/m^3$ or lower. From the point of further improving the balance between light weight and mechanical strength, it is more preferable that the density is 300 $Kg/m^3$ or higher and 600 $Kg/m^3$ or lower, and it is particularly preferable that the density is 350 $Kg/m^3$ or higher and 550 $Kg/m^3$ or lower.

The thickness of a thermoplastic resin foamed sheet is not particularly limited, but from the point of further improving the balance between the bending easiness and the mechanical strength, for example, it is preferable that the thickness is 0.5 mm or more and 4.0 mm or less, and it is more preferable that the thickness is 1.0 mm or more and 2.5 mm or less. Further, on the thermoplastic resin foamed sheet, a non-formed layer may be formed on both surfaces or one surface. That is, a thermoplastic resin foamed sheet may have a configuration including a foamed layer and a non-foamed layer formed on the foamed layer. Since a non-foamed layer is formed on a surface of the thermoplastic resin foamed sheet, the mechanical strength of the wire exterior body 11 is further improved, and the performance of protecting the wire harness 2 accommodated in the accommodating part 31 is further improved.

The thickness of a non-foamed layer is not limited. For example, the thickness may be 10 μm or more and 100 μm or less.

Further, the foam number density of the foamed layer of a thermoplastic resin foamed sheet is not limited particularly, but from the point of preventing the anisotropy of the mechanical characteristics more reliably, it is preferable that the lower limit value thereof is 800 pieces/$mm^3$ or more, and it is more preferable that the value is 1000 pieces/$mm^3$ or more. On the other hand, from the point of obtaining excellent mechanical strength more reliably, the upper limit value of the foam number density may be $10^{10}$ pieces/$mm^3$ or less, for example. Note that the foam number density in the present invention is calculated by capturing a scanning electron microscope (SEM) photograph of a vertical cross section of a thermoplastic resin foamed sheet, counting the number of foams n existing in an arbitrary area of 100 μm by 100 μm in the foamed layer on the SEM photograph, calculating the number of foams existing per 1 $mm^2$, and multiplying the obtained value by 3/2 to thereby convert it into the number of foams per 1 $mm^3$.

Next, a method of forming an exterior-covered wire harness 1 by attaching the wire harness 2 to the wire exterior body 11 will be described with use of FIGS. 1 and 2.

First, a cutout process of cutting out a part constituting the wire exterior body 11, from a resin sheet that is a mother member for forming the wire exterior body 11 (for example, thermoplastic resin foamed sheet), is performed. As illustrated in FIG. 2, in the cutout process, a protruding part 50' serving as the locking piece 50 protruding from a portion forming the inner lid wall part 24 is also formed. Thereafter, on the cutout resin sheet, each of the bending portion 200*a*, the bending portion 200*b*, the bending portion 200*c*, and the bending portion 200*d* is formed by a half-cut process of not penetrating the resin sheet in the thickness direction, for example. Thereafter, a slit 40' corresponding to the shape and the dimension of the protruding part 40 is formed in a direction from the boundary portion between the side wall part 23 and the outer lid wall part 25, that is, the bending portion 200*d* serving as the first edge portion 23-1 to the boundary between the side wall part 23 and the bottom wall part 21, that is, the bending portion 200*b* serving as the second edge portion 23-2. The slit 40' corresponding to the shape of the protruding part 40 penetrates the resin sheet in the thickness direction.

Thereafter, the bottom wall part 21, the side wall part 22, and the side wall part 23 are formed by bending the bending portion 200*a* and the bending portion 200*b*. Thereafter, the wire harness 2 is inserted from the opening between the side wall part 22 and the side wall part 23, and is placed on the bottom wall part 21. Thereafter, after the inner lid wall part 24 is formed by bending the bending portion 200*c*, the outer lid wall part 25 is formed by bending the bending portion 200*d*. When the bending portion 200*d* is bent, the slit 40' corresponding to the shape of the protruding part 40 protrudes from the side wall part 23 in the vertical direction with respect to the longitudinal direction x to thereby form the protruding part 40. Further, since the protruding part 40 is formed from the slit 40', the through hole 51 is formed in the side wall part 23. Accordingly, the position and the shape of the through hole 51 correspond to the position and the shape of the slit 40'.

Thereafter, when the locking piece 50 that is the protruding part 50' of the resin sheet is inserted into the through hole 51, the inner lid wall part 24 is fixed to the side wall part 23 and the accommodating part 31 is formed. Thereby, the wire harness 2 is inserted and accommodated in the accommodating part 31 of the wire exterior body 11, whereby the exterior-covered wire harness 1 is formed.

As described above, since the slit 40' penetrating the resin sheet in the thickness direction is formed in the boundary portion between the side wall part 23 and the outer lid wall part 25, the protruding part 40 is formed when the bending portion 200*d* is bent. Therefore, the protruding part 40 can be provided easily and quickly.

Next, a wire exterior body 61 according to a second exemplary embodiment of the present invention will be described. Note that the constituent elements that are the same as those of the wire exterior body 11 according to the first exemplary embodiment are described using the same reference numerals.

In the wire exterior body 11 according to the first exemplary embodiment, the protruding part 40 is provided on only one edge portion of the two edge portions facing each other, of the side wall part 23, along the extending direction of the wire harness 2. Instead, as illustrated in FIG. 3, in the wire exterior body 61 according to the second exemplary embodiment, a plurality of protruding parts 40*a* to 40*c* are provided, at predetermined intervals, to the two edge portions facing each other, of the side wall part 23, along the extending direction of the wire harness 2 (longitudinal direction x of the wire exterior body 61), that is, to both the first edge portion 23-1 and the second edge portion 23-2. Protruding parts 40-1*a* to 40-1*c* provided on the first edge portion 23-1 are arranged to face protruding parts 40-2*a* to 40-2*c* provided on the second edge portion 23-2, respectively. Accordingly, each of the protruding parts 40-1*a* to 40-1*c* provided on the first edge portion 23-1 is arranged on a straight line in the orthogonal direction with respect to the longitudinal direction x, with each of the protruding parts 40-2*a* to 40-2*c* provided on the second edge portion 23-2. Further, on the first edge portion 23-1 side of the protruding parts 40-2*a* to 40-2*c*, through holes 51*a* to 51*c* are formed in contact with the protruding parts 40-2*a* to 40-2*c*.

Since the protruding parts 40 are provided on the two edge portions along the extending direction of the wire harness 2 so as to face each other, the wire exterior body 61 exhibits excellent fixing stability to the mounting target such as a vehicle or the like.

In the wire exterior body 61 according to the second exemplary embodiment, in addition to forming slits penetrating the resin sheet in the thickness direction corresponding to the protruding parts 40 in the boundary portion between the side wall part 23 and the outer lid wall part 25, slits penetrating the resin sheet in the thickness direction corresponding to the protruding parts 40 are also formed in the boundary portion between the side wall part 23 and the bottom wall part 21. Thereby, the protruding parts 40*a* to 40*c* can be formed on the first edge portion 23-*a* and the second edge portion 23-2.

Next, a wire exterior body 71 according to a third exemplary embodiment of the present invention will be described. Note that the constituent elements that are the same as those of the wire exterior bodies 11 and 61 according to the first and second exemplary embodiments are described using the same reference numerals.

In the wire exterior body 61 according to the second exemplary embodiment, the protruding parts 40-1*a* to 40-1*c* provided on the first edge portion 23-1 are arranged to face the protruding parts 40-2*a* to 40-2*c* provided on the second edge portion 23-2, respectively. Instead, as illustrated in FIG. 4, in the wire exterior body 71 according to the third exemplary embodiment, the protruding parts 40-1*a* and 40-1*b* provided on the first edge portion 23-1 is not arranged to face a protruding part 40-2 provided on the second edge portion 23-2. In the wire exterior body 71, the protruding part 40-2 is arranged between the protruding part 40-1*a* and the protruding part 40-1*b* provided on the first edge portion 23-1. More specifically, in the wire exterior body 71, the protruding part 40-2 is arranged at the intermediate point between the protruding part 40-1*a* and the protruding part 40-1*b* or the vicinity thereof, whereby the protruding parts 40 are arranged in a zigzag manner on the side wall part 23.

In the wire exterior body 71, since the protruding parts 40 are arranged in a zigzag manner, the fixing stability of the wire exterior body 71 with respect to the mounting target such as a vehicle or the like is improved, while the arranged number of protruding parts 40 is further reduced, that is, further reducing the contact area between the wire exterior body 71 and the mounting target such as a vehicle or the like is further reduced so that the vibration noise is further suppressed.

Next, a wire exterior body according to another exemplary embodiment of the present invention will be described. In the wire exterior body of each of the exemplary embodiments described above, the shape of the protruding part 40 in the protruding direction is a quadrangular shape. Instead, as illustrated in FIG. 5A, it may be a trapezoidal shape (in FIG. 5A, a trapezoidal shape in which the tip end portion 41 of the protruding part 40 is narrower than the base portion 42 of the protruding part 40). Since it is in a trapezoidal shape, in particular, in a trapezoidal shape in which the tip end portion 41 of the protruding part 40 is narrower than the base portion 42 of the protruding part 40, the contact area between the wire exterior body and the mounting target can be further reduced, whereby the vibration noise can be further suppressed. Moreover, since the protruding part 40 is in the trapezoidal shape, it is possible to prevent a portion of the mounting target that contacts the tip end portion 41 of the protruding part 40 from being damaged.

Further, as illustrated in FIG. 5B, the shape of the protruding part 40 in the protruding direction may be a quadrangular shape in which at least some corners are formed in a rounded corner shape. In FIG. 5B, at the tip end portion 41 of the protruding part 40, corners are formed in a rounded corner shape. At the tip end portion 41 of the protruding part 40, since the corners are formed in a rounded corner shape, the contact area between the wire exterior body and the mounting target can be further reduced, whereby the vibration noise can be further suppressed. Moreover, since the rounded corner shape is formed at corners of the tip end portion 41 of the protruding part 40, it is possible to prevent a portion of the mounting target that contacts the tip end portion 41 of the protruding part 40 from being damaged.

Further, as illustrated in FIG. 5C, the shape of the protruding part 40 in the protruding direction may be a trapezoidal shape in which the tip end portion 41 of the protruding part 40 is wider than the base portion 42 of the protruding part 40. The shape of the protruding part 40 in the protruding direction may be a triangular shape or a semicircular shape.

In the wire exterior body of each of the exemplary embodiments described above, the shape of the tip end portion 41 of the protruding part 40 is a linear shape along the longitudinal direction x of the wire exterior body that is the extending direction of the wire harness 2. Instead, it may be processed in a wave shape in which a curved recessed part 43 and a curved protruding part 44 are repeated as illustrated in FIG. 6. Since the tip end portion 41 of the protruding part 40 is processed in a wave shape, the contact area between the wire exterior body and the mounting target can be further reduced, whereby the vibration noise can be further suppressed. Moreover, since the tip end portion 41 of the protruding part 40 is processed in a curved wave shape, it is possible to prevent a portion of the mounting target that contacts the tip end portion 41 of the protruding part 40 from being damaged.

In the wire exterior body of each of the embodiments described above, since the locking piece 50 is locked to the through hole 51, the inner lid wall part 24 is fixed to the side wall part 23, and the plurality of wall parts 20 and the accommodating part 31 are kept in a predetermined shape. However, the locking piece 50 may not be provided. That is, for keeping the plurality of wall parts 20 in a predetermined shape, it is possible to use another means instead of the locking means provided by the locking piece 50. As another means, for example, welding means such as ultrasonic welding or thermal welding or adhesion means such as an adhesive or adhesive tape may be used for joining the wall part overlapping portions.

Further, in the wire exterior body of each of the exemplary embodiments described above, the protruding part 40 is provided on the side wall part 23 among the plurality of wall parts 20. However, the protruding part 40 may be provided on the side wall part 22, the bottom wall part 21, or the outer lid wall part 25, instead of the side wall part 23. Moreover, the protruding parts 40 may be provided on two or more wall parts among the side wall part 23, the side wall part 22, the bottom wall part 21, and the outer lid wall part 25. By forming the slits 40' penetrating the resin sheet in the thickness direction in the predetermined bending portions 200a to 200d among the bending portions 200a to 200d, it is possible to form the protruding parts 40 in the predetermined wall parts in the bending process of the resin sheet.

In the wire exterior body of each of the exemplary embodiments described above, the cross-sectional shape in the short direction y of the plurality of wall parts 20 is a quadrangular shape. However, the shape in the short direction y is properly selectable according to the used condition or the like of the wire exterior body. For example, it may be a triangular shape or a polygonal shape such as a pentagon or more. Moreover, in the wire exterior body of each of the exemplary embodiments, the shape in the longitudinal direction x is a linear shape. However, the shape in the longitudinal direction x is properly selectable according to the wiring state of the wire harness. For example, it may be a shape having a curved portion, a shape having a linear portion and a curved portion, a shape having a branch, or the like.

INDUSTRIAL APPLICABILITY

In the present invention, a contact area between a wire exterior body and a mounting target is reduced, so that vibration noise generated by vibration of the exterior body or a wire harness in the exterior body, caused by vibration of the mounting target, can be reduced. Therefore, the present invention is highly applicable in the field of exterior body of a wire harness to be routed on an automobile, for example.

LIST OF REFERENCE SIGNS 1 exterior-covered wire harness,
11, 61, 71 wire exterior body,
20 wall parts,
31 accommodating part,
40 protruding part

The invention claimed is:
1. A wire exterior body to be attached to an outer periphery of a wire, the wire exterior body being formed by bending a resin sheet, the wire exterior body comprising
   a plurality of wall parts extending along an extending direction of the wire, and forming an accommodating part for accommodating the wire, wherein
   a first wall part of the plurality of wall parts has a protruding part protruding from the first wall part,
   wherein the protruding part protrudes in a direction orthogonal to the first wall part,
   wherein a second wall part of the plurality of wall parts has a second protruding part protruding from the second wall part,
   wherein the second wall part is orthogonal to the first wall part.
   wherein the second protruding part is arranged to overlap the protruding part,
   wherein the resin sheet is a resin foamed sheet, wherein the resin foamed sheet includes a foamed layer and a non-foamed layer formed on the foamed layer, and wherein the foamed layer and the non-foamed layer are integral to the resin sheet.

2. The wire exterior body according to claim 1, wherein a plurality of protruding parts including the protruding part is provided at predetermined intervals along the extending direction of the wire at an edge portion of the first wall part along the extending direction of the wire.

3. The wire exterior body according to claim 1, wherein the protruding part is provided on a first edge portion, along the extending direction of the wire, of the first wall part, and on a second edge portion along the extending direction of the wire, the second edge portion facing the first edge portion.

4. The wire exterior body according to claim 3, wherein the plurality of protruding parts including the protruding part is arranged in a zigzag manner.

5. The wire exterior body according to claim 1, wherein a tip end portion of the protruding part is narrower in width compared with a base portion of the protruding part.

6. The wire exterior body according to claim 1, wherein a shape of the protruding part in a protruding direction is a triangular shape, a trapezoidal shape, a rectangular shape, or a quadrangular shape in which at least a part of corners is formed in a rounded corner shape.

7. The wire exterior body according to claim 1, wherein a tip end portion of the protruding part is in a wave shape.

8. The wire exterior body according to claim 1, wherein the protruding part is arranged at an interval ranging from 3 cm to 20 cm along the extending direction of the wire.

9. An exterior-covered wire harness comprising:
a wire harness; and
the wire exterior body according to claim 1, wherein the wire exterior body is attached to an outer periphery of the wire harness.

10. The wire exterior body according to claim 2, wherein the protruding part is provided on a first edge portion, along the extending direction of the wire, of the first wall part, and on a second edge portion along the extending direction of the wire, the second edge portion facing the first edge portion.

11. The wire exterior body according to claim 2, wherein a tip end portion of the protruding part is in a wave shape.

12. The wire exterior body according to claim 3, wherein a tip end portion of the protruding part is in a wave shape.

13. The wire exterior body according to claim 1, wherein a density of the resin foamed sheet is 200 Kg/m3 or higher and 1000 Kg/m3 or lower.

* * * * *